March 13, 1934.  W. B. LERCH  1,950,854
LIQUID SAMPLER AND METHOD FOR SAMPLING LIQUIDS
Filed March 28, 1930   3 Sheets-Sheet 1

INVENTOR.
William B. Lerch
BY
ATTORNEYS.

March 13, 1934. W. B. LERCH 1,950,854
LIQUID SAMPLER AND METHOD FOR SAMPLING LIQUIDS
Filed March 28, 1930  3 Sheets-Sheet 2
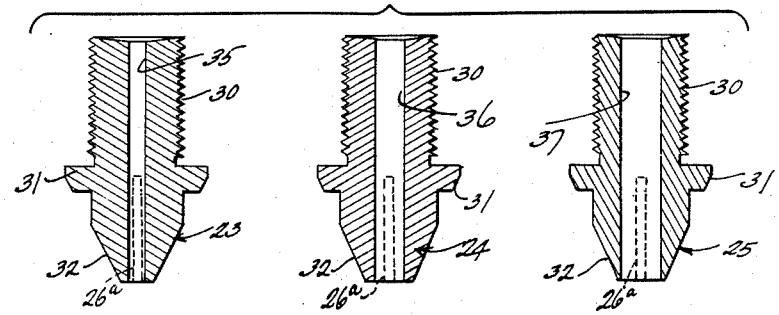
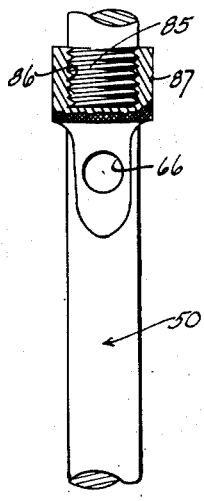
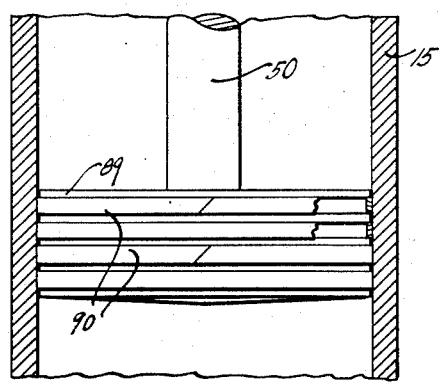
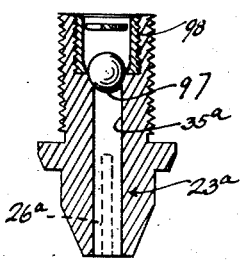
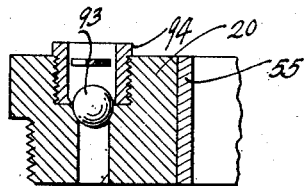
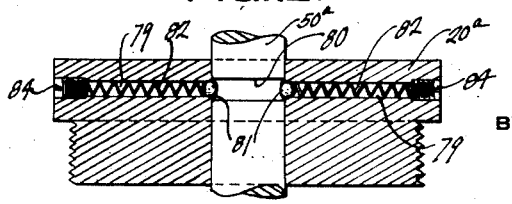
INVENTOR.
William B. Lerch
BY *Lancaster Allwine and Rommel*
ATTORNEYS.

March 13, 1934.  W. B. LERCH  1,950,854
LIQUID SAMPLER AND METHOD FOR SAMPLING LIQUIDS
Filed March 28, 1930   3 Sheets-Sheet 3
FIG. 10.
FIG. 11.
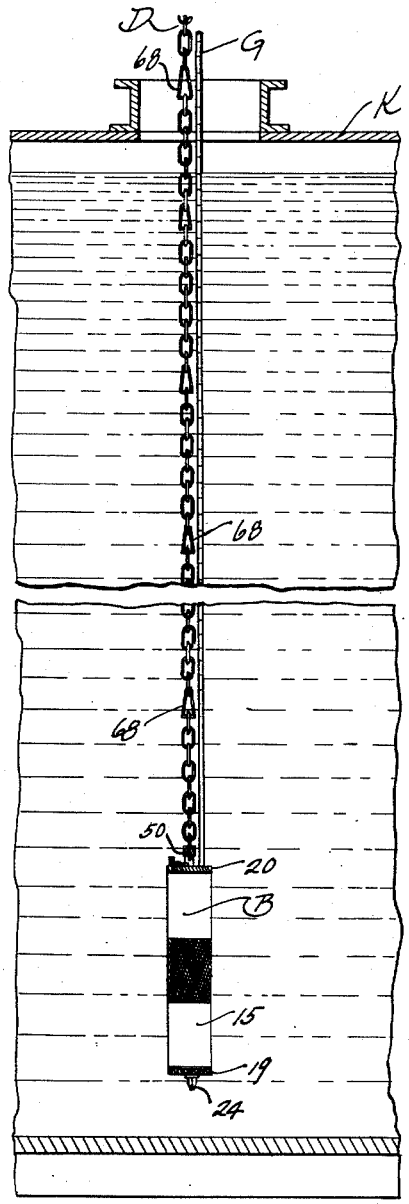
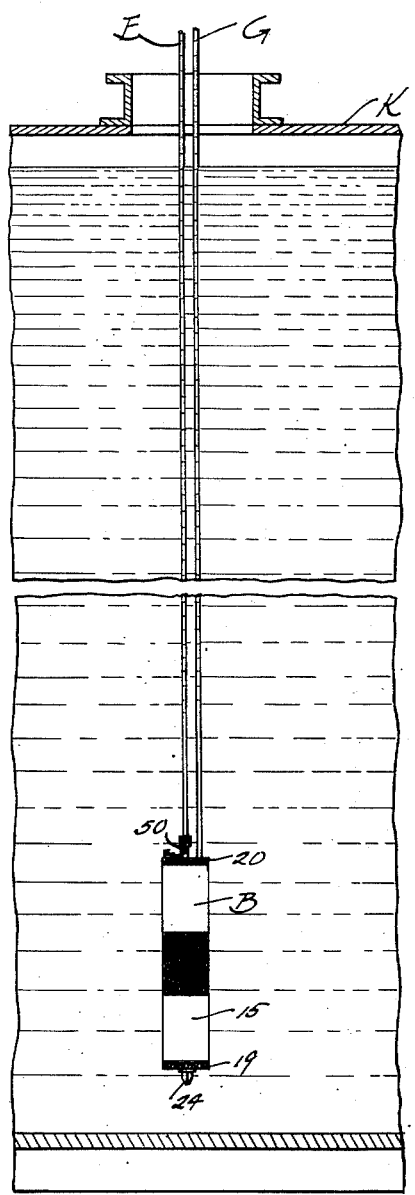
INVENTOR.
William B. Lerch
BY *[signature]*
ATTORNEYS.

Patented Mar. 13, 1934

1,950,854

UNITED STATES PATENT OFFICE 1,950,854

LIQUID SAMPLER AND METHOD FOR SAMPLING LIQUIDS

William Bruce Lerch, Bartlesville, Okla.

Application March 28, 1930, Serial No. 439,772

11 Claims. (Cl. 137—18)

This invention relates to improvements in liquid sampling devices.

The primary object of this invention is to provide a so-called oil thief, which is particularly well adapted for the accurate taking of characteristic samples of a body of crude oil, gasoline, or other liquid product in a manner which will facilitate taking of accurate samples throughout a body of liquid at predetermined levels, and in a manner which will maintain the characteristic sample in whole condition after removal from the body of liquid, without liability of leakage or depreciation caused by evaporation.

A further object of the invention is the provision of an improved method for sampling bodies of liquid, such as oil, gasoline, or other petroleum or liquid products, wherein a container is submerged within the body of liquid to predetermined levels where the various samples are taken in accurate quantity by improved suction means which draws the liquid at the particular level or strata in predetermined amount into the sampler, where it may or may not be co-mingled with other samples taken from other levels for the production of a characteristic average sample of the liquid.

A further object of this invention is the provision of improved means for lowering and manipulating a liquid sampler within a body of liquid for the extraction from the body of liquid of characteristic and typical samples at various levels.

Other objects and advantages of this invention will be apparent during the course of the following detailed description.

In the accompanying drawings, forming a part of this specification, and wherein similar reference characters designate corresponding parts throughout the several views.

Figure 5 is a view showing in section a plurality of nozzles which may be selectively used in the cylinder for calibrating the inlet opening according to the viscosity of the liquid from which the sample is to be taken.

Figure 6 is a fragmentary sectional view of the outer end of a piston rod showing means to effect an operating connection with a line under control of the operator for moving the piston.

Figure 7 is a vertical sectional view showing a modified form of piston for the cylinder, utilizing piston rings.

Figure 8 is a sectional view showing a check valve type of vent.

Figure 9 is a vertical sectional view showing a modified type of nozzle utilizing a check valve controlled inlet duct.

Figure 10 is a view showing a modified type of supporting means for lowering the sampler within a body of liquid.

Figure 11 is a view showing a still further modified type of supporting and control means for the sampler.

Figure 12 is a fragmentary sectional view taken through the upper top of a sample cylinder showing improved detent means to control the sampling operation.

Figure 1:
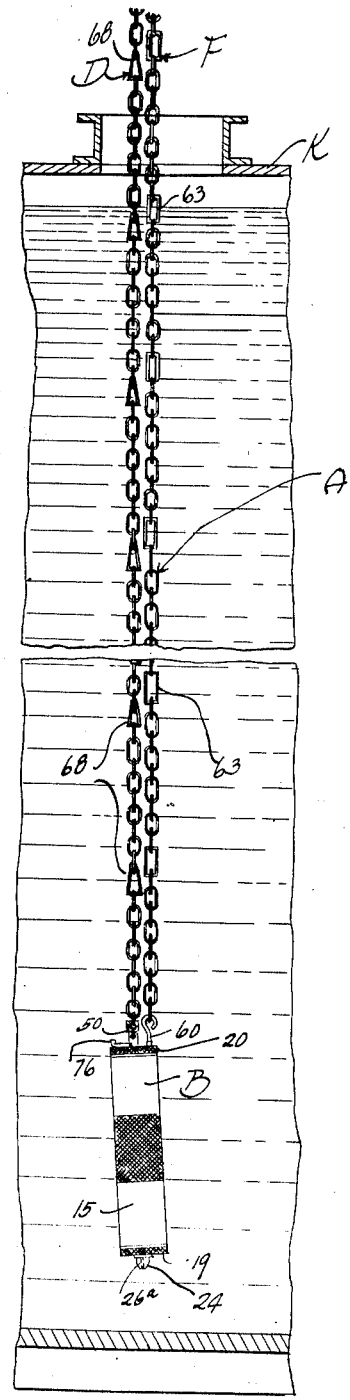
Figure 1 is a fragmentary sectional view showing the manner in which a preferred sampler may be lowered or disposed within a body of liquid within a tank or other container, for the extraction of a sample at a predetermined level.
Figure 2:
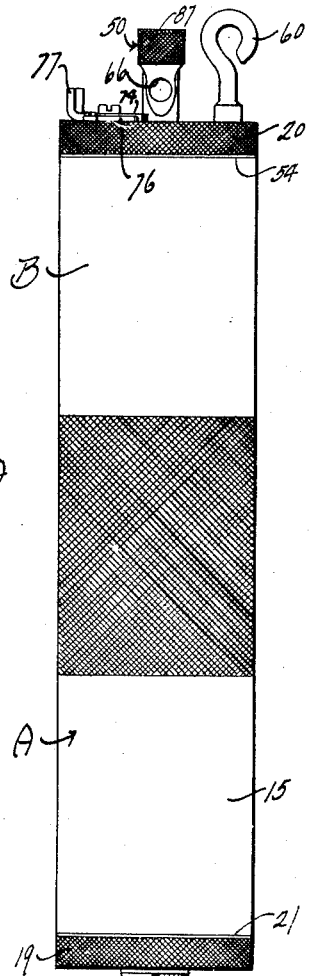
Figure 2 is a side elevation of the improved sample cylinder or container.

In the drawings, wherein for the purpose of illustration are shown preferred and modified forms of the invention, the letter A may generally designate the improved sampler, which consists of a cylinder B of predetermined capacity, having piston means C operative thereupon, controlled by means D or E from a location about the body of liquid from which the sample is to be taken. Means F or G may be selectively used for lowering and supporting the sample container B within the body of liquid.

In so-called oil thieves which have heretofore been used for taking samples of liquid from a large or deep body of liquid, a door or other trap has been the conventional means of admitting the liquid to the chamber of the sampler, and the operator is called upon to guess the quantity of liquid taken into the sampler at various levels, with resulting inaccuracy. These closure operated type of samplers or oil thieves have not been very satisfactory, and in addition to the inaccurate taking of samples, the parts are arranged so that they very readily become out of order, and do not provide a leak-proof arrangement, so that very often liquid leaks from the container, and invariably must be removed immediately after withdrawal from the body of liquid from which the sample has been taken.

Figure 4:
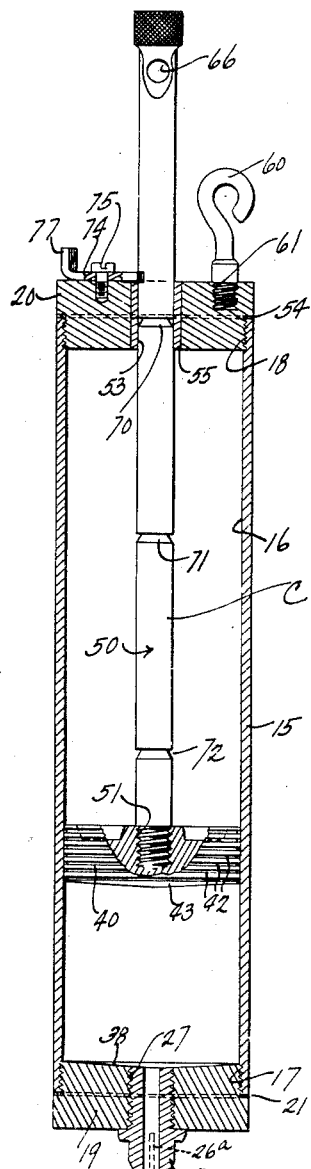
Figure 4 is a vertical sectional view taken through the improved sampler of Figure 2, showing the operating relation of piston means associated therewith for drawing of liquid samples into the cylinder.

In my sampler the container B comprises a cylindrical body or shell 15, which may be of brass, bronze, aluminum, steel, non-corrosive metal, glass or vitreous material, depending upon its exact use and the manner in which it is supported and operated. Preferably it is of steel, and the chamber 16 thereof is very accurately bored and machined. It is internally screw threaded at its lower and upper ends at 17 and 18 respectively, for receiving detachable bottom and top caps or walls 19 and 20. The detachable end cap or wall 19 has a reduced screw threaded shank which is threaded into the opening 17, and consequently it has an annular shoulder adapted to receive a gasket 21 which is clamped by adjustment of the cap upon the body 15 against the lower edge of the latter, as shown in Figure 4. The cap 19 is preferably provided with a duct or orifice through which the liquid sample is admitted and discharged, and the orifice may be formed directly in the integral cap 19 if desired. However, inasmuch as the sampler is adaptable for use in liquids of various viscosities, it is preferred to provide a series of nozzles 23, 24 and 25, or any other greater or less number, adapted to selectively fit within a screw threaded passageway 27 tapped centrally in the cap 19. These nozzles 23, 24 and 25 are very accurate as to their fit upon the cap 19; each being provided with a screw threaded shank 30 adapted to screw thread into the opening 27; an annular flange 31 being provided for abutment against the lower surface or outer surface of the cap or wall 19 when the nozzle is in place. The extreme outer end 32 of each of the nozzles is tapered to a blunt end. These nozzles 23, 24 and 25 are provided with axial ducts or passageways 35, 36 and 37, respectively of gradually increasing diameter. For liquids having a low co-efficiency of viscosity such as gasoline or crude oil, the nozzle 23 is used, and of course for heavier liquids, such as some crude oils, fuel oil or heavy lubricating oils, the nozzle 25 may be used. The nozzles preferably have vent ducts or slots 26a provided in opposite exterior sides to permit air to vent from a bottle being filled, as the nozzle in most instances will rest in the neck opening.

For reasons which will more fully appear hereinafter, the chamber facing surface of the end wall 19 is tapered or dished-shaped slightly at 38 from the outer periphery of the cap axially towards the center of the nozzle within the cap at the time; the upper ends of the nozzles 23, 24 and 25 being similarly recessed or dished. This taper insures that all of the liquid will be forced or drained from the sampler when the piston apparatus C is operated to engage the piston against the surface 38.

Referring for the time being to the piston construction C, the piston head 40 is of any approved material, lightened by hollowing out the upper part thereof if found necessary. It is preferably ground to fit the chamber 16 and is provided with a plurality of annular grooves 42 wherein the liquid is trapped to provide an oil seal, preventing leak past the piston. A bottom surface 43 of the piston head 40 is tapered convergently from the periphery of the piston head towards the axis, in the same angularity as the tapered surface 38, so that the surfaces 43 and 38 will interfit exactly and upon pressing the piston 40 down upon the wall 19 all of the liquid will be discharged from the chamber 13 into the duct of the nozzle. The piston construction further more includes a piston rod 50, of approved material, screw threaded at 51 axially in the piston head. This piston rod 50 is seated for snug sliding through the axial passageway 53 in the top cap 20 of the sample container B. This cap 20 is preferably of the same nature as the cap 19, that is, it has a reduced screw threaded lower end for screw threading in the end 18 of the shell or casing 15, and has an annular shoulder which forces a packing ring 54 into engagement with the top edge of the body 15 of the cylindrical sampler. A sleeve bushing 55 may be provided axially in the cap 20, through which the piston rod 50 slidably extends, as is shown in Figure 4 of the drawings.

Several means are employed to support and operate the improved sample taking device. It must be borne in mind the device is used to take liquid samples from large tanks or containers which are sometimes very deep. In the main it is intended to be used by oil gaugers whose duties comprise the taking of characteristic samples from a storage tank, such as will enable the purchaser or others to gauge of the value of the contents. It may, of course, be put to other uses. In the preferred instance the casing or barrel B is provided on the cap 20 with a detachable eye 60, which is screw threaded in a suitable screw threaded socket 61 provided inwardly from the top of the cap or end wall 20. The supporting chain or cable F is preferably flexible in character and has the bottom link or coupling hooked upon the eye 60. In the preferred instance this flexible support F will be a chain, with distinguishing links 63 at intervals which are predeterminedly spaced, such as will enable the operator not only to determine the depth to which the sample container is lowered into the body of liquid, but which will enable a relative determination of movement between the same and the piston operating means, as will be subsequently described.

The piston rod 50 at the upper end thereof exterior of the sample container B is provided with a transverse opening or other suitably positioned eye 66, which is adapted to detachably receive the lower hook end of a flexible cable or chain D. In the preferred instance the flexible chain D will be a chain, and it is provided with distinguishing links 68 at predetermined spaced intervals throughout the length of the chain.

In the operation of the parts which have been above described, the gauger lowers the sample barrel B in its empty condition into the tank K, shown in Figure 1; the chain or cable F being used to lower the barrel B to the desired level. In the ordinary instance the sample barrel B is lowered until its nozzle end is close to the bottom of the tank K wherein the body of liquid is stored. The piston head 40, prior to lowering of the sample device into the liquid into the tank K has of course been moved into abutment with the bottom cap 19, under which circumstances no liquid can enter the chamber 16 during the lowering of the sampler B to the desired level. When the liquid level at which the sample is to be taken has been reached, the operator, who holds both of the flexible cables D and F in his hands will pull upwardly on the cable D. This moves the piston head 40 upwardly in the chamber 16 of the sample barrel, and it is drawn up for the desired distance; the operation creating a suction in the chamber 16 below the piston 40 and drawing liquid from the storage tank into the lower part of the barrel or casing B. The extent to which the piston 40 is moved in the casing B may be determined by the extent to which one of the special links 68 has been moved upwardly with respect to one of the special links 63 of the supporting cable F adjacent the hand of the gauger or operator. In the ordinary operation three samples will be taken, that is, a sample at the lower portion of the body of the liquid; a sample at the intermediate level of the body of liquid, and a sample of liquid near the top of the body of liquid. These three samples ordinarily are co-mingled in the chamber 16, and at each level it is intended to fill one-third of the chamber of the barrel or container B. When the sample has been properly taken the device is of course withdrawn from the tank. Due to the viscid condition of the liquid; its capillarity in the minute duct of the nozzle, and also due to the suction of the piston operating in the cylinder or container, the entire liquid sample will be maintained in the chamber 16, with the piston head 40, of course, against the end cap or wall 20, without liability of leakage, even though no check valve is provided in the inlet port of the nozzle at the bottom of the cylinder. Therefore, without fear of loss of the sample, the gauger may lay the sample device aside and continue with the gauging operation elsewhere, with the assurance that the sample taken will not leak from the improved sample container.

The supporting and operating devices F and D respectively are preferably flexible, not alone for purposes of compactness, but because they really facilitate the operations of supporting and drawing the sample into the container.

Figure 3:
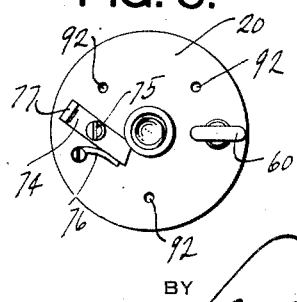
Figure 3 is a top plan view of the improved sample cylinder of Figure 2.

It is preferred to provide some means for determining with exactness the extent of piston movement in the cylinder during the taking of a sample. This may be important not only when taking the full number of samples to fill the barrel, but it may be important in connection with the taking of a single or less than total number of samples. One means of increasing the accuracy of taking the sample is to provide the piston rod 50 with a plurality of annular grooves 70, 71, and 72 at predetermined spaced intervals downwardly along the rod. These grooves may be suitably concaved, but in the preferred instance they are provided by upwardly tapering the surface annularly about the piston rod at the location of the grooves, in uniform sloping relation and abruptly terminating in downwardly facing shoulders. As shown in Figures 3 and 4 of the drawings, a movable detent 74 is pivotally mounted at 75 upon the top of the cap 20, having a spring 76 operating against the free end thereof to normally force it into engagement with the outer surface of the piston rod 50. A handle end 77 may be provided to swing the detent back against said spring pressure away from the piston rod. With such a construction the piston head is elevated in the sample chamber 60 by the means above described, or by other means to be subsequently mentioned, and when the detent 74 is spring urged into the uppermost groove 70 of the piston rod it will produce a click which may be felt or otherwise transmitted to the operator. At this time the piston head is raised one-third of the distance along the chamber 16 and the sample at the lower level of the body of liquid has been taken and trapped in the chamber. The operation is then repeated at another level in the body of liquid from which a sample is to be taken, until the detent 74 clicks into the second groove 71. Successive samples may be taken in like manner, and it is to be understood that more than three samples may be taken, and more than three of the grooves provided in the piston rod, if conditions warrant. An additional and very important purpose served by the grooves 70, 71 and 72 is that after the detent snaps into these grooves, the spring will hold the detent in such position that the piston head cannot lower in the barrel B for forcing any part of the trapped sample therefrom.

A modified form of supporting the piston rod for the same purpose immediately above described is shown in Figure 12, wherein the cap 20ª is provided with diametrically opposed passageways 78 and 79, within the inner ends of which ball detents 81 are operated to engage in the grooves 80 of the piston rod 50ª, as shown in Figure 12. These detents 81 may be retained by suitable shoulders against too far ingress in the passageway of the trap through which the piston rod is slidable, and each of the detents has a spring 82, under compression in the passageways 78 and 79, held under compression therein by suitable set screws 84. Operation of this structure for the purpose above described will be quite apparent.

Under some circumstances, especially where the improved sample device is used in bodies of liquid that are not too deep for the purpose, the rod G is used, which is of inherently rigid material. The rod G due to its slenderness will have a slight flexibility, which is not of any apparent advantage. It has a lower screw threaded end (not shown) which is screw threaded into the socket 61 in the top of the cap 20; the hook or eye 60 of course, being removed for the purpose. This rod G enables the operator to hold the gauge device truly vertical and rigid, and at a specified depth while the sample is being filled with fluid; the barrel or sample receiving container B being prevented from riding upwardly in the liquid upon pulling the piston upwardly, so that an accurate sample may be taken at the exact level intended. The rod G may be graduated, as shown, to determine the extent to which the sample container is lowered. This rod G also enables the sample receptacle or container to be made of much lighter material than where the supporting cable F is used, since it is then not necessary to depend upon the weight of the sample receptacle to hold it stationary at a certain depth while the fluid sample is being obtained by upward movement of the piston.

If desired, the plunger mechanism may be operated by means of the rigid rod E. This rod E is provided with a lower screw threaded end 85, as shown in Figure 6, which may be detachably connected in the upwardly facing screw threaded socket 86 in the top end 87 of the piston rod 50, immediately above the eye 66 above described. This rod E may be suitably graduated to accurately determine the extent to which it is moved, and it may be used with either the flexible supporting cable F or the rigid rod G, as shown in Figure 11.

In lieu of accurate grinding of the piston head 40 for an oil or liquid seal fit in the passageway 16 of the barrel 15, I may provide a piston head 89, such as shown in Figure 7, having annular grooves wherein expansible piston rings 90 fit for preventing loss of compression in a manner which is quite apparent.

As is shown in Figure 3 of the drawings the top cap 20 of the barrel or container B may be provided with a plurality of small vents 92, which are just sufficient to permit discharging of air from above the piston head of the plunger mechanism during the up-pull of the latter for the taking of a sample. They are not sufficiently large to permit any great amount of liquid to enter the upper part of the barrel B above the piston during the submergence of the sample taking device. If desired, these ducts or vent ports 92 may be enlarged at their upper ends, as shown in Figure 8 of the drawings to provide a seat for receiving suitable check valves 93 held in place by suitable plug and spider 94, as well shown in Figure 8. The check valves 93 permit exit of air, but in the vertical position of the sample receiver the check valves 93 will not admit liquid, but they may be tipped off their seat or the sample receptacle inclined to permit the piston head to be lowered into the chamber 16 for either discharging the sample or preparing for the taking of a sample.

Under some circumstances it may be necessary to provide a check valve in the nozzle at the lower end of the sample receiver, to permit the intake of a liquid sample, but to prevent the exit thereof except under authorized conditions. Thus, as shown in Figure 9 of the drawings, the nozzle device 23ª has a duct 35ª therethrough which is enlarged at the upper end and provides a seat upon which a gravity operated check valve ball 97 seats and guarded by means of a counter-sunk plug spider 98. This ball 97 lifts under the suction created by upward movement of the piston head to admit the liquid sample to the chamber 16 in a manner which is quite apparent.

It can be appreciated from the foregoing that an improved method has been provided by means of which accuracy in the taking of samples is assured. This will result in great economy to purchasers of oil. The sampler operates on the vacuum principle; the piston mechanism creating the partial vacuum in the casing which positively draws the liquid sample into the container and holds it there until positively discharged under authorized conditions. The device does not really require the modified check valve devices as shown, and one of its great advantages over prior art devices is the fact that no manually operated valve means need be provided to insure the intake or discharge of the sample with respect to the sample receptacle.

In the drawings the flexible chains or cables have been shown relatively large. However, the size of links is a matter of choice, and it is preferred that the distinctive links 63 and 68 be placed at about four inch intervals throughout the entire length of each of the supporting or operating chains or cables. The sample receiver is slightly over two and one-half inches internal diameter, and the receiver of the chamber of somewhat less than twelve inches in length, so that the tube will hold approximately thirty-two ounces of sampling fluid.

Various changes in the steps of the method of sampling, as well as in the shape, size, and arrangement of parts may be made to the forms of invention herein shown and described, without departing from the spirit of the invention or the scope of the claims.

I claim:
1. The method of sampling from a deep body of liquid having different characteristics at different levels which consists in lowering an empty sample receiver into the liquid near the bottom of the body of liquid, creating a suction within a part of the receiver and drawing a predetermined quantity of liquid from the bottom of the body of liquid into part of the container, shutting off the suction and elevating the container within the body of liquid to a different level, again creating suction within the receiver and drawing a second sample of liquid of predetermined quantity from the last mentioned level into the receiver in co-mingled relation with the first mentioned sample, and thus continuing the filling by suction in the receiver and co-mingling of the samples at different levels in the body of liquid for obtaining a characteristic average sample of the body of liquid.

2. The method of obtaining samples from a relatively deep body of liquid such as contained in a tank car or storage tank, which consists in disposing within the body of liquid at a predetermined level an empty sample container, creating suction within the container and drawing thereinto a predetermined quantity of liquid from that level in the body of liquid, shutting off the suction and moving the container to another level in the body of liquid without removal from the liquid, and again creating suction within the container and drawing thereinto a second sample of liquid from the second level of the same quantity as the first sample and in comingled relation therewith.

3. The method of obtaining samples from a deep body of liquid which consists in disposing within the body of liquid at a predetermined level an empty sample container, creating suction within the container and drawing thereinto a quantity of liquid from that level in the body of liquid, shutting off the suction and moving the container to another predetermined level in the body of liquid without removal from the liquid, again creating suction within the container and drawing thereinto a second quantity of liquid from the second level, and thus continuing the suction withdrawal of samples from the body of liquid at other and relatively different levels without withdrawal from the body of the liquid until the container is filled to the desired extent for the obtaining of a characteristic average sample.

4. The method of sampling from a deep body of liquid having different characteristics at different levels which consists in lowering from above the body of liquid an empty sample receiver into the liquid to a predetermined level, creating a suction within the receiver through an operation performed above the body of liquid for the drawing into the receiver a sample of liquid at the level of the receiver and of predetermined quantity, shutting off the suction and moving the container by an operation performed above the body of liquid to a different predetermined level within the body of liquid without removal of the receiver from the liquid, and again creating a suction within the container for the drawing thereinto of a sample of substantially the same quantity of liquid from the second level by means of an operation performed above the body of liquid.

5. In a liquid sampler the combination of a casing having an orifice leading thereinto, a plunger device operable in the casing including an operating rod extending exteriorly of the casing, said rod having a plurality of obstructions thereon, and detent means carried by the casing for engaging said obstructions as the piston rod is moved relative to the casing.

6. In a liquid sampler the combination of a casing having an orifice leading thereinto, a plunger device operable in the casing including an operating rod extending exteriorly of the casing, said rod having a plurality of obstructions thereon, detent means carried by the casing for engaging said obstructions as the piston rod is moved relative to the casing, spring means operating the detent means to force it against said rod, said obstructions being shaped to prevent moving of the rod back into the casing when engaged by said detent means.

7. In a liquid sampling device the combination of a sample receiver having a plunger operating therein for drawing liquid thereinto, a supporting cable for suspending the receiver at predetermined depths in a body of liquid, an operating line connected with the plunger and extending in adjacent relation with said supporting line to a location above the body of liquid, said supporting line and plunger operating line having distinguishing indicia thereon for determining the extent of relative movement therebetween, said plunger connected operating line comprising a link chain in which the distinguishing indicia consists of distinguishing links at predetermined intervals.

8. In a device for taking samples of liquid from various levels in a deep body of liquid the combination of a sample casing having an orifice therethrough, a plunger operable in the casing including a portion extending exteriorly of the casing, a long inherently stiff rod connected with the casing for holding the casing at predetermined levels submerged in the body of liquid, and a flexible operating line connected with the plunger and extending through the body of liquid to a point thereabove for operating the plunger within the casing for withdrawing samples of liquid thereinto.

9. In a device for taking samples of liquid from various levels in a deep body of liquid the combination of a sample casing having an orifice therethrough, a plunger operable in the casing including a portion extending exteriorly of the casing, a long inherently stiff rod connected with the casing for holding the casing at predetermined levels submerged in the body of liquid, an operating line spaced besides and eccentric to the above mentioned rod connected with the plunger and extending through the body of liquid to a point thereabove for operating the plunger within the casing for withdrawing samples of liquid thereinto, said operating line comprising a link chain.

10. In a liquid sampling device the combination of a casing having an orifice leading thereinto, a plunger device operating in the casing for drawing liquid thru the orifice thereinto including an operating rod extending exteriorly of the casing, said rod having a plurality of circumferential notches therein at spaced predetermined distances therealong, and spring urged means normally acting against said rod for engaging in said notches as the rod is moved into or out of the casing.

11. In a liquid sampling device the combination of an elongated cylindrical body having top and bottom walls, a calibrated inlet nozzle upon the bottom wall detachably connected therewith, a piston slidable within the body, a rigid plunger rod connected with the piston and slidably extending thru the top wall of the body and having means at the outer end thereof for connection with an operating line, and other means upon the top wall of the body eccentric to the piston rod for connecting a supporting line thereto.

WILLIAM BRUCE LERCH.